(12) United States Patent
Wu et al.

(10) Patent No.: US 9,146,938 B2
(45) Date of Patent: Sep. 29, 2015

(54) SATELLITE NAVIGATION METHOD AND SYSTEM

(75) Inventors: Kuo-Chen Wu, Taoyuan (TW);
Yih-Feng Kao, Taoyuan (TW);
Chih-Feng Hsu, Taoyuan (TW)

(73) Assignee: HTC CORPORATION, Taoyuan District, Taoyuan (TW)

( * ) Notice: Subject to any disclaimer, the term of this patent is extended or adjusted under 35 U.S.C. 154(b) by 595 days.

(21) Appl. No.: 12/343,547

(22) Filed: Dec. 24, 2008

(65) Prior Publication Data

US 2009/0171564 A1 Jul. 2, 2009

(30) Foreign Application Priority Data

Dec. 31, 2007 (TW) ................................ 96151592 A

(51) Int. Cl.
*G06F 17/30* (2006.01)
*G01C 21/36* (2006.01)
(52) U.S. Cl.
CPC ...... *G06F 17/30241* (2013.01); *G01C 21/3647* (2013.01); *G06F 17/3028* (2013.01)
(58) Field of Classification Search
CPC .. G06Q 50/22; G06Q 50/24; G06F 17/30241; G06F 17/30244
USPC .......................................................... 701/213
See application file for complete search history.

(56) References Cited

U.S. PATENT DOCUMENTS

| | | | | |
|---|---|---|---|---|
| 6,006,161 | A * | 12/1999 | Katou | 701/410 |
| 6,151,539 | A * | 11/2000 | Bergholz et al. | 701/25 |
| 6,477,526 | B2 * | 11/2002 | Hayashi et al. | 1/1 |
| 6,694,252 | B2 * | 2/2004 | Ukita | 701/205 |
| 7,272,498 | B2 * | 9/2007 | Singh | 701/211 |
| 7,539,572 | B2 | 5/2009 | Kamikawa et al. | |
| 7,587,276 | B2 * | 9/2009 | Gold et al. | 701/211 |
| 2002/0032035 | A1 * | 3/2002 | Teshima | 455/456 |
| 2004/0174443 | A1 | 9/2004 | Simske | |

(Continued)

FOREIGN PATENT DOCUMENTS

| | | |
|---|---|---|
| CN | 1412525 | 4/2003 |
| EP | 2 071 289 | 6/2009 |
| EP | 2 196 975 | 6/2010 |

OTHER PUBLICATIONS

English language translation of abstract of CN 1412525 (published Apr. 23, 2003).

(Continued)

*Primary Examiner* — Neha Patel
(74) *Attorney, Agent, or Firm* — McClure, Qualey & Rodack, LLP

(57) ABSTRACT

A satellite navigation method and system are provided. The system includes a global position system (GPS) module, an input unit, a picture database, a geographical information system (GIS) module, an integrating unit, and a display unit. The method includes the following steps. Firstly, a navigation area is determined through the input unit, so as to search out several picture batches in the navigation area from the picture database. Next, a map relating to the navigation area is provided by the GIS module. Then, the picture batches and the map are integrated by the integrating unit to produce an integrated map shown on a first frame of the display unit. Afterwards, several pictures of the picture batch chosen from the first frame displayed on a second frame and satellite navigation information of the picture chosen from the second frame are displayed on a third frame by the display unit.

21 Claims, 7 Drawing Sheets

(56) References Cited

U.S. PATENT DOCUMENTS

| | | |
|---|---|---|
| 2004/0193371 A1* | 9/2004 | Koshiji et al. ............ 701/211 |
| 2005/0108261 A1 | 5/2005 | Glassy et al. |
| 2005/0216186 A1* | 9/2005 | Dorfman et al. ............ 701/207 |
| 2005/0288859 A1 | 12/2005 | Golding et al. |
| 2006/0089792 A1 | 4/2006 | Manber et al. |
| 2007/0233368 A1 | 10/2007 | Friedmann |
| 2007/0271297 A1 | 11/2007 | Jaffe et al. |

OTHER PUBLICATIONS

European office action dated May 5, 2011.

* cited by examiner

US 9,146,938 B2

SATELLITE NAVIGATION METHOD AND SYSTEM

This application claims the benefit of Taiwan application Serial No. 96151592, filed Dec. 31, 2007, the subject matter of which is incorporated herein by reference.

BACKGROUND OF THE INVENTION

1. Field of the Invention

The application relates in general to a navigation method and system, and more particularly to a satellite navigation method and system.

2. Description of the Related Art

Many electronic devices with navigation software are available in the market. According to the destination inputted by the user, the best path from the user's current location to the destination is calculated and marked on the map with symbols, such that the user can get to the destination by following the path.

As most navigation software merely provides map information, the user can rely on the map marked with the path and other computer simulated pictures to get to the destination. However, as people's judgments and recognition of the map are very different, those who are not used to or are inexperienced in reading a map are likely to have misjudgments in reading a map.

SUMMARY OF THE INVENTION

The application is directed to a satellite navigation method and system capable of providing many actual pictures of the destination and its nearby area to help the user recognize a correct path, hence largely reducing the likelihood of misjudgments.

According to a first aspect of the present invention, a satellite navigation method is provided. The method includes the following steps. Firstly, a navigation area is determined, and all picture batches in the navigation area are searched out from a picture database. Next, a map relating to the navigation area is provided. Then, the map is displayed on a first frame, and all picture batches are integrated and displayed on corresponding locations in the map. Afterwards, one of all picture batches is chosen from the first frame, and all pictures of the chosen picture batch are displayed on a second frame. Then, one of all pictures is chosen from the second frame. Lastly, satellite navigation information relating to the chosen picture is displayed on a third frame.

According to a second aspect of the present invention, a satellite navigation system is provided. The system includes a global position system (GPS) module, an input unit, a picture database, a geographical information system (GIS) module, an integrating unit, and a display unit. The GPS module is used for detecting and obtaining a user's current location. The input unit is used for inputting a destination, wherein a navigation area is determined according to the user's current location and the destination. The picture database is for a user to search out all picture batches in the navigation area. The GIS module includes a GIS database which provides a map relating to the navigation area. The integrating unit is used for integrating all picture batches and the map to produce an integrated map. The integrated map is marked with all picture batches and the user's current location. The display unit is used for displaying the integrated map on a first frame and capable of displaying all pictures of the picture batch chosen from the first frame on a second frame and displaying a satellite navigation information of the picture chosen from the second frame on a third frame.

The invention will become apparent from the following detailed description of the preferred but non-limiting embodiments. The following description is made with reference to the accompanying drawings.

DETAILED DESCRIPTION OF THE INVENTION

Figure 1:
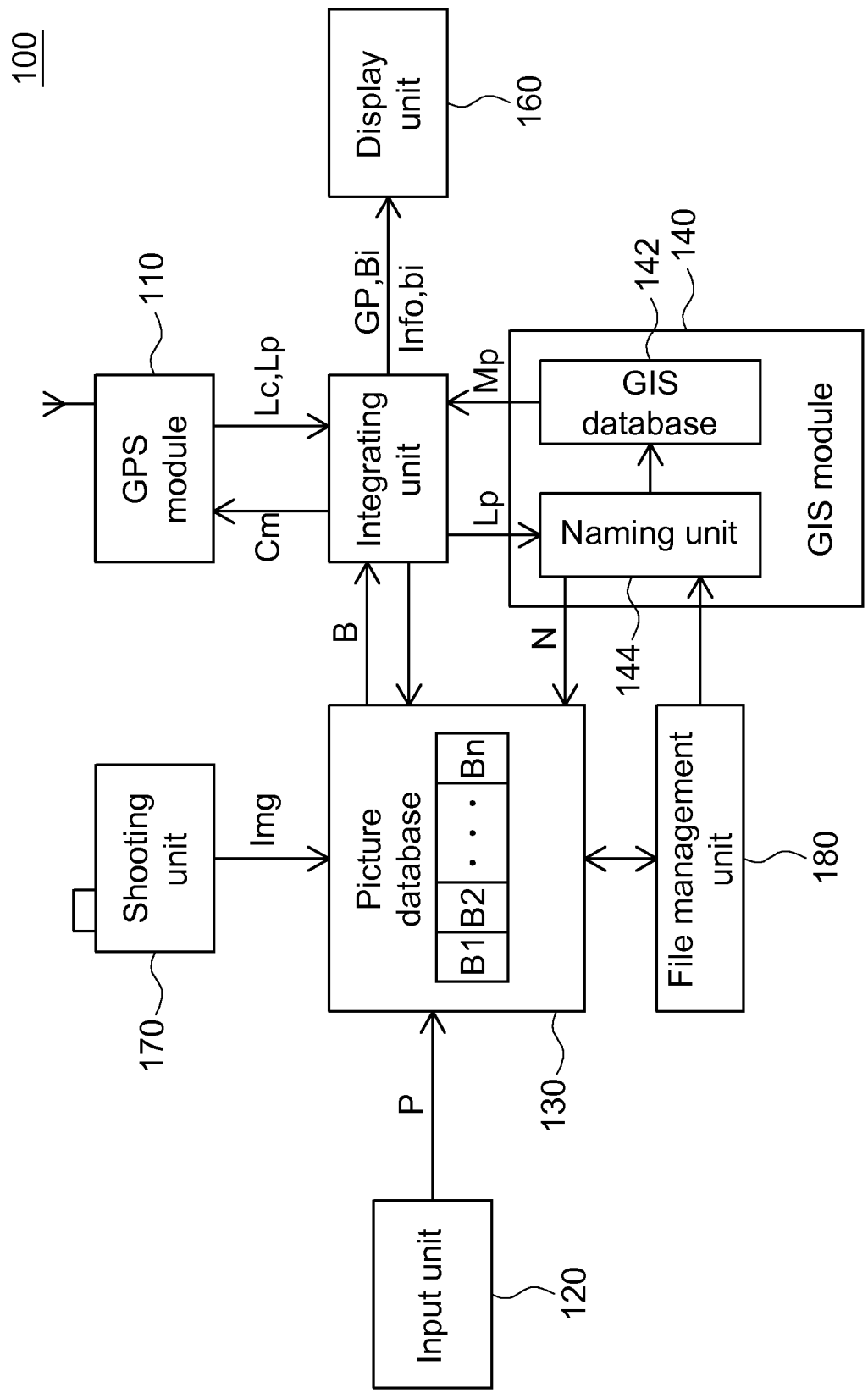
FIG. 1 shows a block diagram of a satellite navigation system according to an embodiment of the invention.

Referring to FIG. 1, a block diagram of a satellite navigation system according to an embodiment of the invention is shown. The satellite navigation system 100 includes a global position system (GPS) module 110, an input unit 120, a picture database 130, a geographical information system (GIS) module 140, an integrating unit 150, and a display unit 160.

The GPS module 110 is used for detecting and obtaining a user's current location Lc of the GPS module 110, that is, the current location of the user who is operating the system 100. The input unit 120 is used for inputting a search parameter P such as a locality and its maximum distance or a destination, such that a navigation area is determined according to the user's current location and the search parameter P. The picture database 130 stores several picture batches B1~Bn for the user to search out several picture batches B in the navigation area, wherein n is a positive integer. Each picture batch includes several pictures such as a specific building, a specific street or many different pictures with other significant features.

The GIS module 140 includes a GIS database 142 used for providing a map relating to the navigation area MP to the integrating unit 150. The integrating unit 150 is used for integrating the picture batches B and the map MP to produce an integrated map GP, wherein the picture batches and the user's current location Lc are marked on the integrated map GP. The display unit 160 is used for displaying the integrated map GP on a first frame, and is capable of displaying several pictures of the picture batch Bi chosen from the first frame on a second frame and displaying the picture bj chosen from the second frame and a satellite navigation information thereof on a third frame.

Figure 2:
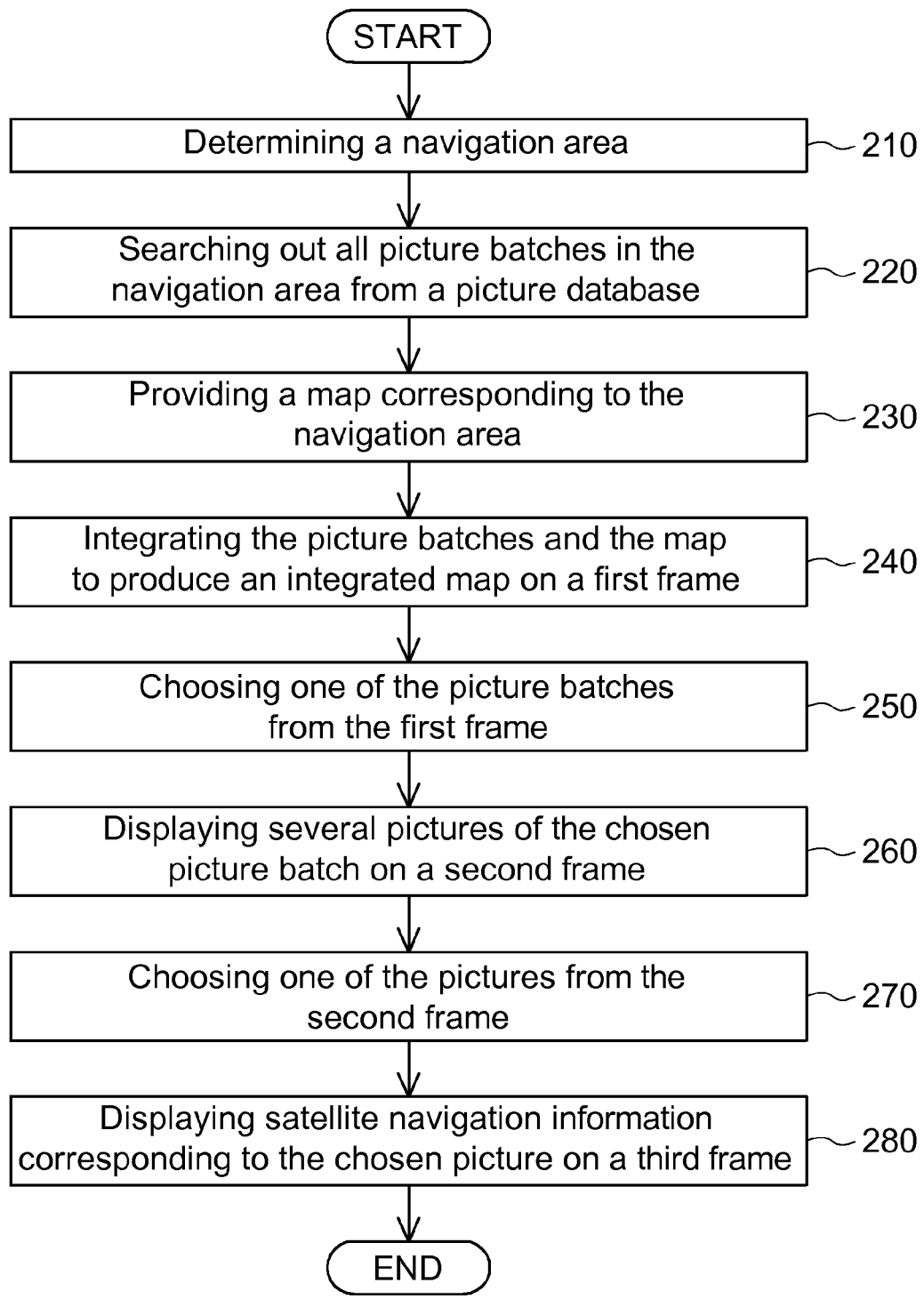
FIG. 2 shows a flowchart of a satellite navigation method according to the embodiment of the invention.
Figure 4A:
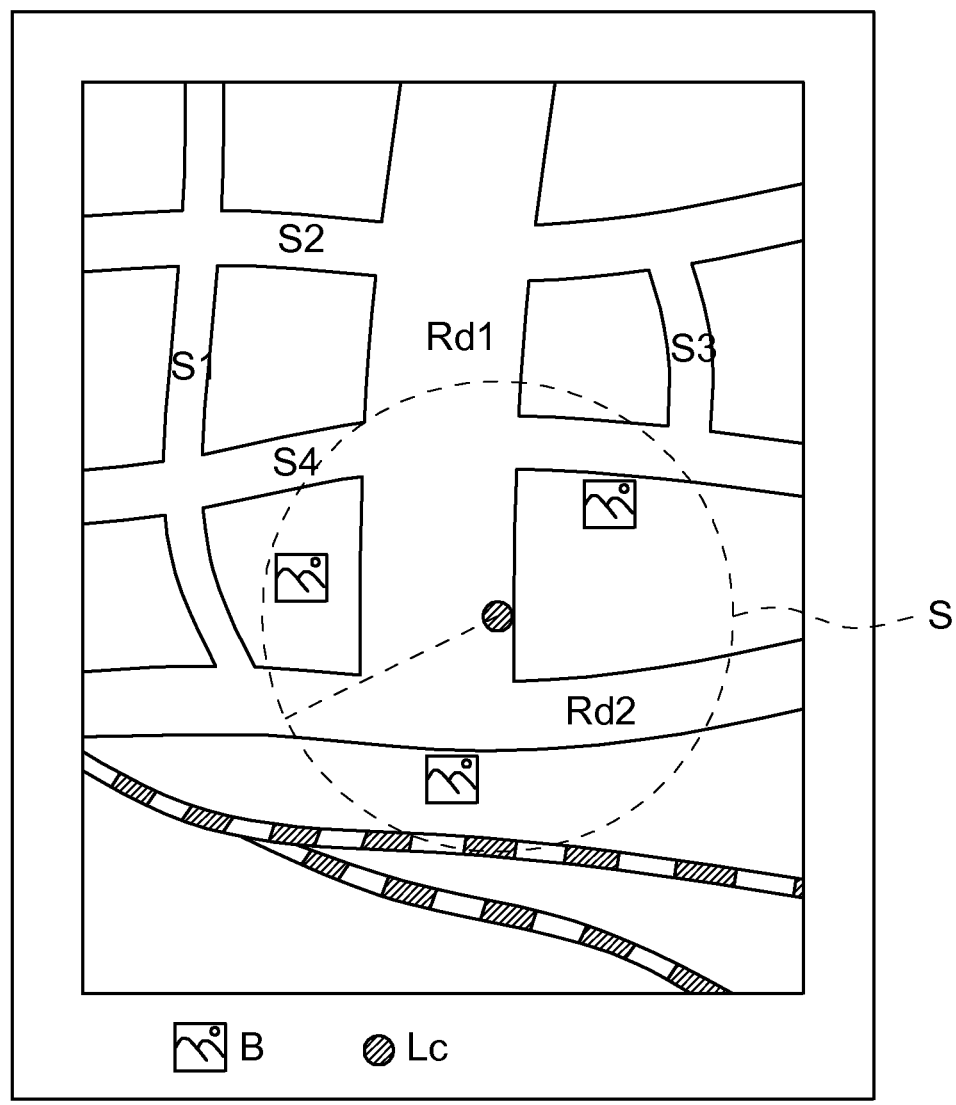
FIGS. 4A~4C respectively show the first frame to the third frame displayed by a display unit of the satellite navigation system in FIG. 1.

Referring to FIG. 2, a flowchart of a satellite navigation method according to the embodiment of the invention is shown. Firstly, the method begins at step 210, a navigation area is determined. As indicated in FIG. 4A, the navigation area S preferably is determined according to a detected user's current location Lc and a destination (or a locality and its distance d) inputted by the user. Next, the method proceeds to step 220, several picture batches B in the navigation area S are searched out from the picture database 130. Then, the method proceeds to step 230, a map MP relating to the navigation area S is provided. Afterwards, the method proceeds to step 240, the picture batches B and the map MP are integrated to produce an integrated map GM which is displayed on a first frame 161. However, if no picture batch is searched out in step 220, then the method returns to step 210 to redefine a range of the navigation area.

Figure 4B:
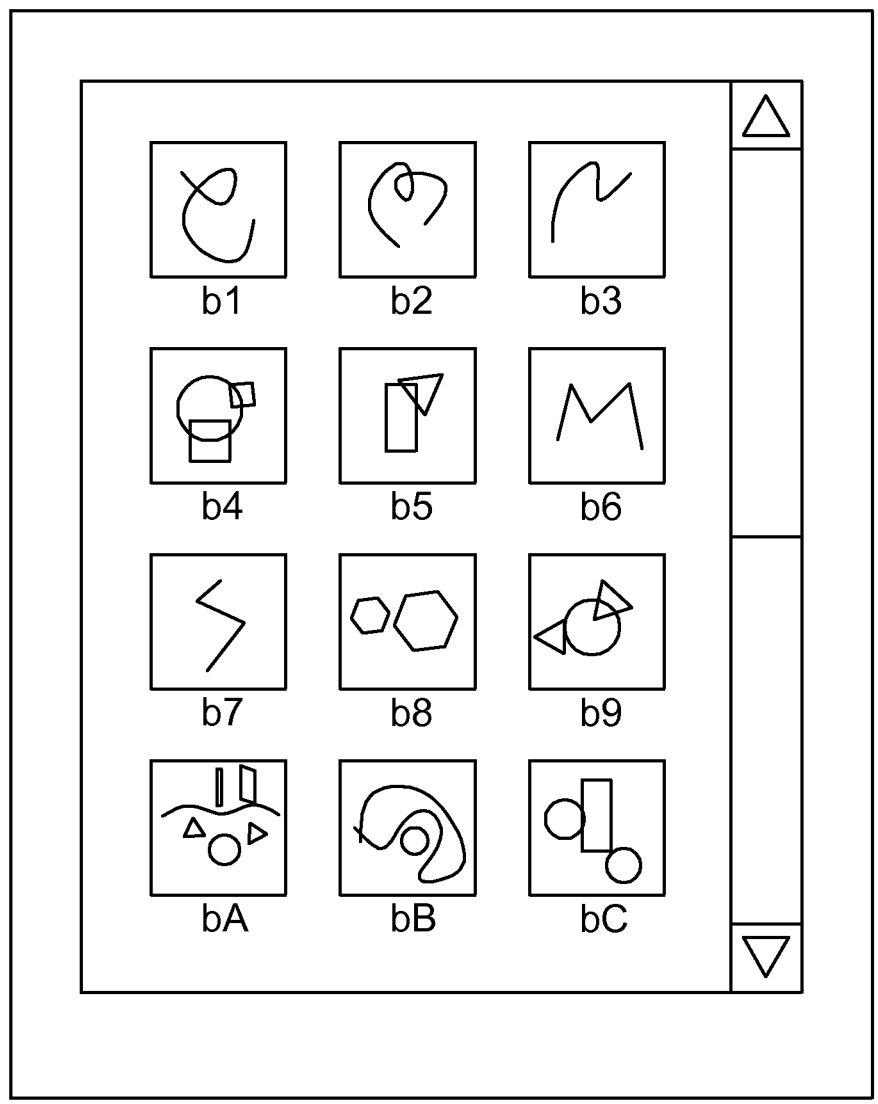
Figure 4C:
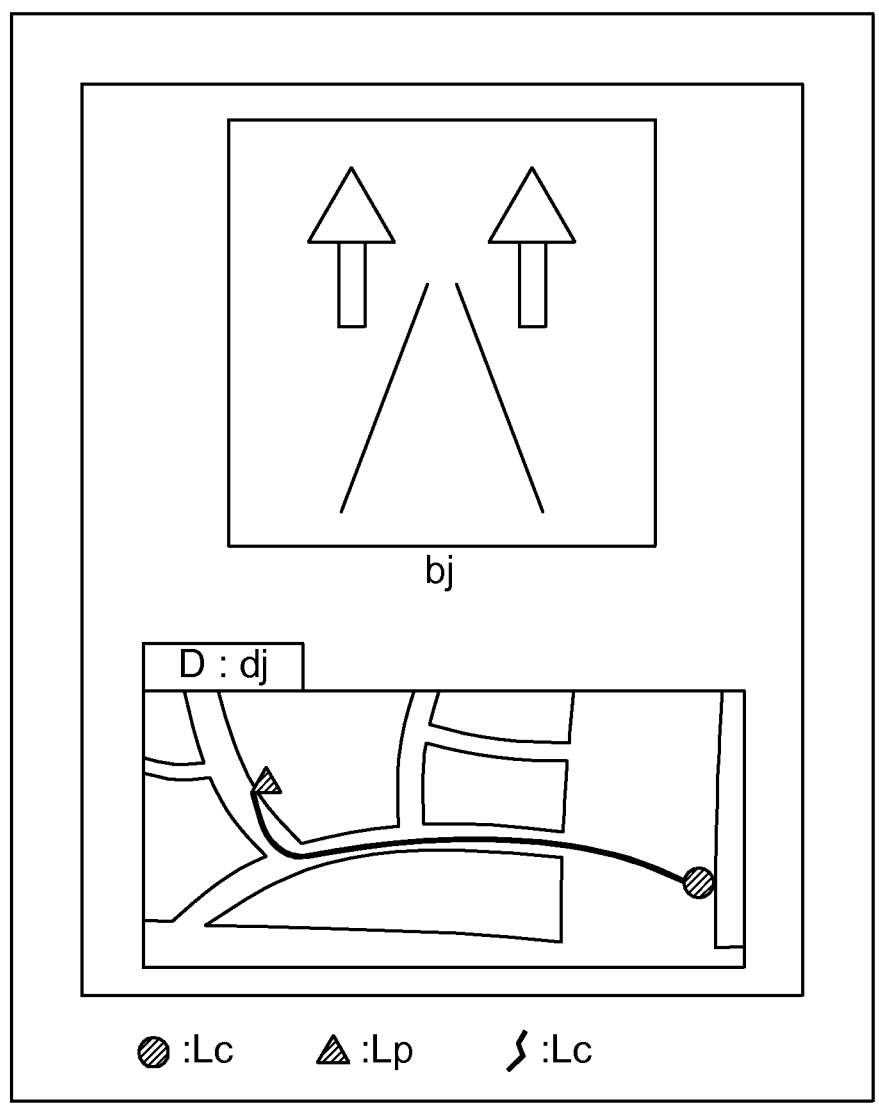

As indicated in FIG. 4A, several picture batches B and the user's current location Lc are marked on the integrated map GM. Next, the method proceeds to step 250, one picture batch Bi is chosen from several picture batches B of the first frame 161, then the second frame 162 in FIG. 4B is entered. After that, the method proceeds to step 260, several pictures b chosen from the picture batch Bi are displayed on the second frame 162. Then, the method proceeds to step 270, one picture bj is chosen from the pictures b of the second frame 162, then the third frame 163 in FIG. 4C is entered. Lastly, the method proceeds to step 280, the satellite navigation information corresponding to the chosen picture bj is displayed on the third frame 163. As each picture has a shooting location Lp, the satellite navigation information includes a distance dj and a path Re from the user's current location Lc to the shooting location Lp. Besides, the chosen picture bj can also be displayed on the third frame 163.

Before the searching step 220 in FIG. 2 is executed, the satellite navigation method of the embodiment of the invention further includes establishing a picture database 130 to facilitate the subsequent step of searching a picture. The picture database 130 is established according to the picture storing method in FIG. 3 by way of storing each shot picture in the picture database 130 so as to provide a sufficient and systematic source of picture data.

Again, referring to FIG. 1, the satellite navigation system 100 further includes a shooting unit 170 and a file management unit 180. The GIS module 140 further includes a naming unit 144. The shooting unit 170 is used for shooting a picture Img. When the system inputs the shot picture Img, the GPS module 110 further detects the shooting location Lp of the shot picture Img and the integrating unit further records the shooting location Lp in an attribute area of the shot picture Img. The naming unit 144 is linked to a GIS database 142 for providing a location name N according to the shooting location Lp and naming the shot picture Img according to the location name N and a shooting date. The file management unit 180 is used for managing the file data of the picture database 130. Meanwhile, to avoid the repetition in the name of a data folder, the file management unit further determines if the picture database 130 already stores the picture batch named the location name N, such that each shot picture Img is systematically stored in the picture database 130.

Figure 3:
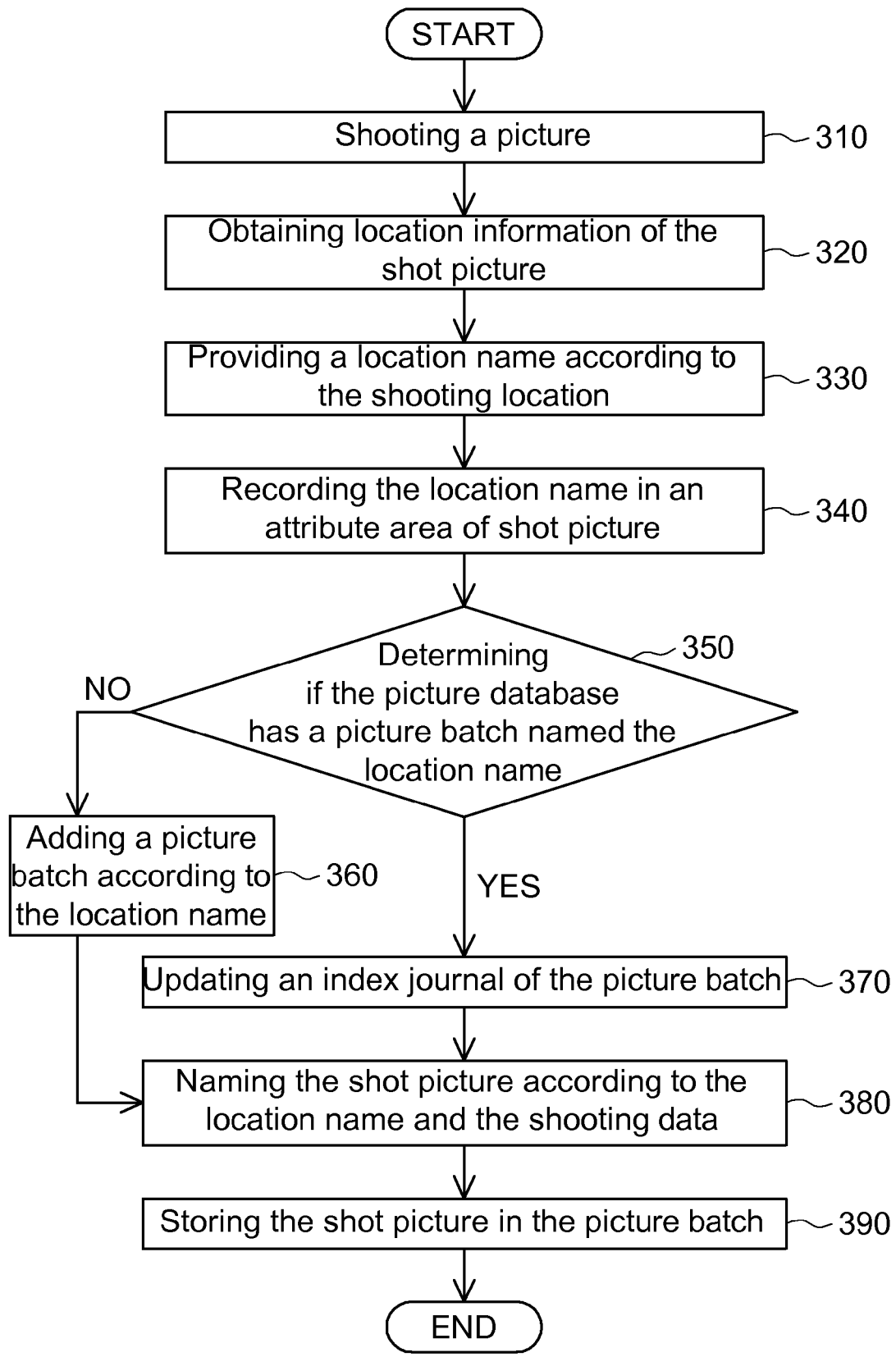
FIG. 3 shows a flowchart of a method of storing a picture according to the embodiment of the invention.

Referring to FIG. 3, a flowchart of a method of storing a picture according to the embodiment of the invention is shown. The method begins at step 310, a picture Img is shot. Next, the method proceeds to steps 320 and 330, location information of the shot picture Img is obtained. In step 320, the shooting location Lp of the shot picture Img is detected. In step 330, a location name N is provided according to the shooting location Lp. Then, the method proceeds to step 340, the location information and the shot picture Img are integrated with the shooting location Lp or the location name N is recorded in an attribute area of the shot picture Img to facilitate the subsequent step of storing the shot picture in the picture batch of the picture database 130 according to the location information.

Before the shot picture is stored, a decision is made in step 350 to determine if the picture database 130 has a picture batch named the location name N. If the picture database 130 does not have such a picture batch named the location name N, then the method proceeds to step 360 to add a picture batch according to the location name N and directly executes step 380. If it is determined in step 350 that the picture database 130 already has such picture batch and the picture batch includes another picture with another shooting date, then the method proceeds to step 370 to update an index of the picture batch and then proceeds to step 380.

Figure 5A:
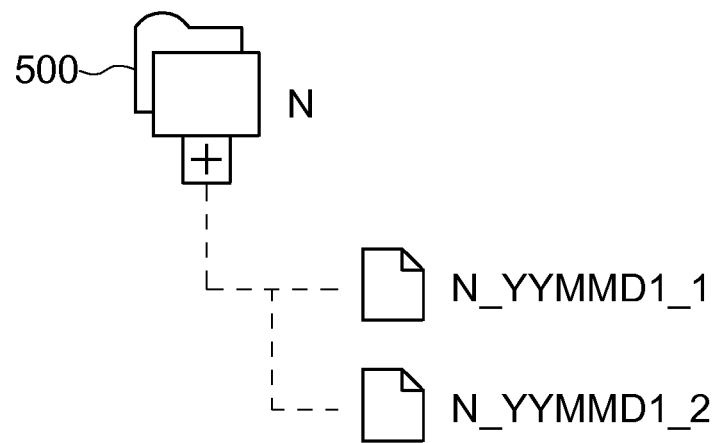
FIGS. 5A and 5B show updated index.
Figure 5B:
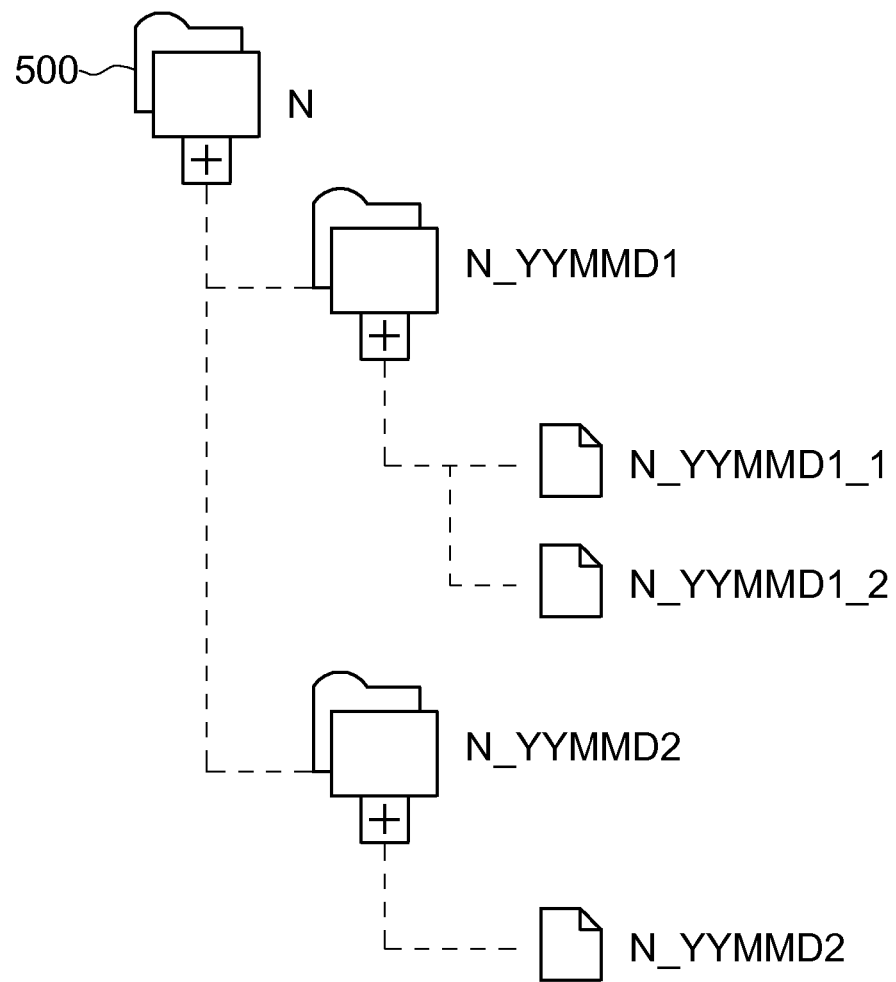

The way of updating the index is exemplified in FIGS. 5A and 5B. When it is determined that the picture database 130 has a picture batch 500 in FIG. 5A and the picture batch 500 includes another two pictures N_YYMMD1_1 and N_YYMMD1_2 with another shooting date YYMMD1, in FIG. 5B, a first data folder is named N_YYMMD1 according to the location name N and the another shooting date YYMMD1 and is added to the picture batch 500, and the two pictures N_YYMMD1_1 and N_YYMMD1_2 are moved to the first data folder N_YYMMD1. Meanwhile, a second data folder is named N_YYMMD2 according to the location name N and the shooting date YYMMD2 and is added to the picture batch 500.

In step 380, the shot picture Img is named N_YYMMD2 according to the location name N and the shooting date YYMMD2. Lastly, the method proceeds to step 390, the shot picture Img is stored in the second data folder N_YYMMD2 of the picture batch 500. Here, the satellite navigation method of the present embodiment terminates.

According to the satellite navigation method and system disclosed in the above embodiment of the invention, as most users would find it easier to recognize an actual picture than to read a map, the GPS module and the GIS module are further integrated with a sufficient and systematic picture database, not only providing the user with a satellite navigation information from the current location to the target location, but further informing the user of many actual pictures near the current location during the course of operating the satellite navigation system. A user who is not versed with the software or is lack of relevant experience still can recognize a correct path with provided information, and the likelihood of misjudgment is largely reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A satellite navigation method, comprising:
   obtaining a search parameter;
   obtaining a current location by a (GPS) module as a user's current location;
   determining a navigation area according to the current location and the search parameter, wherein the current location is directly provided from detecting by the global position system (GPS) module of an electronic device;
   searching out all picture batches in the navigation area from a picture database;
   providing a map relating to the navigation area;
   displaying the map on a first frame and further integrating and displaying all picture batches on corresponding locations in the map by a display unit of the electronic device, wherein the GPS module and the display unit both belong to the electronic device; the picture batches, displayed smaller than the map in size, are integrated into the map on the corresponding locations in the map and the map displayed on the first frame is displayed as a full screen;

detecting one of the picture batches chosen from the integrated map on the first frame;

displaying all pictures of the chosen picture batch on a second frame by the display unit, wherein all pictures of the chosen picture batch displayed on the second frame are displayed as a full screen; the first frame is replaced with the second frame, the map is not displayed when the second frame is displayed by the display unit, and the first frame and the second frame are displayed during a navigation mode;

detecting one of the pictures chosen from the second frame; and displaying a piece of satellite navigation information of the picture chosen from the second frame on a third frame by the display unit, further comprising:

displaying, on the third frame, the piece of satellite navigation information including a path, marked on a map, from the current location to a shooting location of the chosen picture from the second frame, wherein the piece of satellite navigation information of the picture chosen from the second frame displayed on the third frame is displayed as a full screen and the second frame is replaced with the third frame.

2. The satellite navigation method according to claim 1, wherein the step of displaying the map on the first frame and displaying the picture batches on the corresponding locations in the map further comprises:

marking the user's current location on the map.

3. The satellite navigation method according to claim 1, wherein the step of displaying the piece of satellite navigation information further comprises:

displaying a distance from the user's current location to the shooting location of the chosen picture from the second frame.

4. The satellite navigation method according to claim 1, further comprising:

displaying the chosen picture on the third frame after one of the pictures is chosen.

5. The satellite navigation method according to claim 1, further comprising:

establishing the picture database before the searching step, wherein the step of establishing the picture database comprises:

shooting the pictures;

obtaining the location information of the shot pictures and respectively integrating the location information of the shot pictures to each of the pictures;

storing each of the pictures; and grouping the pictures whose location information is within a predetermined distance as the same picture batch, and naming each of the picture batches a location name.

6. The satellite navigation method according to claim 5, wherein the step of obtaining the location information comprises:

detecting the shooting location of each of the pictures;

providing a location name according to the shooting location; and recording the shooting location or the location name in an attribute area of each of the pictures.

7. The satellite navigation method according to claim 6, wherein the step of storing each of the pictures further comprises:

determining whether there are any picture batches named the location name in the picture database.

8. The satellite navigation method according to claim 6, wherein if it is determined that there is no picture batch named the location name in the picture database, the method further comprises:

adding the picture batch named the location name; and storing the shot picture in the added picture batch.

9. The satellite navigation method according to claim 6, wherein if it is determined that the picture database has the picture batch named the location name and the picture batch comprises another picture having another shooting data, the method further comprises:

updating an index of the picture batch; and storing the another picture in the picture batch.

10. The satellite navigation method according to claim 9, wherein the step of updating the index comprises:

adding a first data folder to the picture batch and naming the first data folder according to the location name and the another shooting data;

moving the another picture to the first data folder; and adding a second data folder to the picture batch and naming the second data folder according to the location name and the shooting data.

11. The satellite navigation method according to claim 10, wherein the step of storing the shot picture in the picture batch comprises:

storing the shot picture in the second data folder.

12. A satellite navigation system, comprising:

a global position system (GPS) module for detecting and obtaining a user's current location;

an input unit for inputting a search parameter, wherein a navigation area is determined according to the user's current location directly provided from detecting by the GPS module and the search parameter;

a picture database for searching out all picture batches in the navigation area;

a geographical information system (GIS) module, comprising: a GIS database used for providing a map corresponding to the navigation area;

an integrating unit for integrating the picture batches and the map to produce an integrated map, wherein the integrated map is marked with the picture batches and the user's current location, the picture batches are displayed smaller than the map in size on the corresponding locations in the integrated map; and a display unit for displaying the integrated map on a first frame and capable of displaying all pictures of the picture batch chosen from the first frame on a second frame and displaying a piece of satellite navigation information of the picture chosen from the second frame on a third frame, wherein the GPS module and the display unit both belong to an electronic device; the piece of satellite navigation information includes a path, marked on a map, from the current location to a shooting location of the chosen picture from the second frame; the map displayed on the first frame, all pictures of the chosen picture batch displayed on the second frame, and the piece of satellite navigation information of the picture chosen from the second frame displayed on the third frame are displayed as a full screen by the display unit, respectively, the first frame is replaced with the second frame; the first frame and the second frame are displayed during a navigation mode; and the second frame is replaced with the third; and the map is not displayed when the second frame is displayed by the display unit.

13. The satellite navigation system according to claim 12, wherein the piece of satellite navigation information further comprises a distance from the user's current location to the shooting location of the chosen picture from the second frame.

14. The satellite navigation system according to claim 12, wherein the system further comprises:
a shooting unit for shooting one of the pictures.

15. The satellite navigation system according to claim 14, wherein the GPS module is further used for detecting the shooting location of each shot picture.

16. The satellite navigation system according to claim 15, wherein the integrating unit is further used for recording an attribute area of each shooting location in each shot picture.

17. The satellite navigation system according to claim 15, wherein the GIS module further comprises:
a naming unit linked to the GIS database for providing a location name according to the shooting location and naming the shot picture according to the location name and a shooting data.

18. The satellite navigation system according to claim 17, wherein the system further comprises a file management unit for determining if there are any picture batches named the location name in the picture database.

19. The satellite navigation system according to claim 18, wherein if the file management unit determines that the picture database does not have such picture batch, the picture batch is added and named the location name, and the shot picture is stored in the added picture batch.

20. The satellite navigation system according to claim 12, wherein the piece of satellite navigation information further comprises an enlarged version of the chosen picture from the second frame.

21. The satellite navigation method according to claim 1, wherein the step of displaying the piece of satellite navigation information further comprises:
displaying, on the third frame, an enlarged version of the chosen picture from the second frame.

\* \* \* \* \*